Dec. 20, 1966  H. S. BANKE  3,292,249
MACHINE FOR ASSEMBLING TWO-PIECE OVERCAPS
Filed July 10, 1964  6 Sheets-Sheet 3

Inventor
Henry S. Banke
By Dressler, Goldsmith,
Clement, Gordon & Ladd
Attorneys Dec. 20, 1966 H. S. BANKE 3,292,249
MACHINE FOR ASSEMBLING TWO-PIECE OVERCAPS
Filed July 10, 1964 6 Sheets-Sheet 4

Inventor
Henry S. Banke
By Dressler, Goldsmith, Clement
Gordon & Ladd
Attorneys

Dec. 20, 1966  H. S. BANKE  3,292,249
MACHINE FOR ASSEMBLING TWO-PIECE OVERCAPS
Filed July 10, 1964  6 Sheets-Sheet 5

Inventor
Henry S. Banke
By Dressler, Goldsmith, Clement
Gordon & Ladd Attorneys

Dec. 20, 1966        H. S. BANKE        3,292,249

MACHINE FOR ASSEMBLING TWO-PIECE OVERCAPS

Filed July 10, 1964        6 Sheets-Sheet 6

Inventor
Henry S. Banke ent of the invention by way of example, and in which:

United States Patent Office 3,292,249
Patented Dec. 20, 1966

3,292,249
MACHINE FOR ASSEMBLING TWO-PIECE OVERCAPS
Henry S. Banke, Chicago, Ill., assignor to Helene Curtis Industries, Inc., a corporation of Illinois
Filed July 10, 1964, Ser. No. 381,791
17 Claims. (Cl. 29—211)

This invention relates to a machine for assembling two-piece overcaps, and is particularly concerned with a means for bringing together two separate parts that cannot be molded as a one-piece unit and assembling them rapidly with a minimum of handling.

An overcap, as used in this application, is an outer cap used on pressurized containers for cosmetics, lotions and kindred products in addition to an inner closure member that is used to hold the contents within the container. The overcap protects the dispensing valve and is usually designed to make the package more attractive to the public and thereby enhance its sales appeal.

Although the machine of the present invention may be used in the assembly of any disks and cylinders, it is particularly advantageous in connection with the assembly of two-piece overcaps, such as those having a bottom smaller than the top of the overcap and a disk positioned therein, that cannot be molded as a one-piece unit. In this application, the invention is described with reference to an overcap comprising a tubular conical shell and having its larger upper end closed by a thin top cap or disk. The tubular shell has an annular groove on its inner surface adjacent its larger end, and the peripheral edge of the top disk is forced into the groove to hold the parts assembled to form the complete overcap. The tubular shell or the top disk, or both, may be decorated in any suitable manner to provide an attractive overcap. It will be understood that the invention is not limited to the handling and assembly of this specific construction of overcap.

The apparatus of the present invention comprises a conveyor for carrying the tubular shell to an assembly station where the disk is placed in loose assembly in the top of the tubular shell, then to a second station where the disk is finally pressed into the tubular shell, and finally to a discharge station where the assembled tubular shell and disk is removed from the conveyor. The capacity of the machine is increased by providing the apparatus with multiple mechanisms so the assembly operations can be carried out simultaneously on multiple disks and tubular shell units.

A feature of the invention is the provision of a mechanism for selecting the disks from a random mass of disks, and moving the selected disks to the assembly station. The invention also incorporates an overfeed mechanism to insure an adequate supply of disks at the assembly station.

The mechanism for picking up the disks for transfer to the assembly station includes a bin or hopper to receive a supply of disks in random arrangement. A conveyor extending into this hopper has a reach or flight that is inclined from the vertical and moves upwardly. This conveyor has an articulate series of segments and at the bottom of each is a narrow ledge. Some of the disks in the hopper will by chance become positioned parallel with the plane of the segment and accordingly, will be engaged by the ledge. Each disk comprises a flange and a portion projecting from one face so that the disks are nonsymmetrical about the flange. Thus, when a disk is stood on edge it tends to fall with the projecting portion downward. The conveyor is inclined to the vertical so that when a segment engages the flange of the disk, and if the center of gravity of the disk is on the conveyor side, the disk will tend to lie on the conveyor. However, the ledge is of less height than the projection so a disk that falls with the projection toward the conveyor tends to slide over the flight back into the hopper. The conveyor picks up such disks and carries them to a transfer station near the top of the conveyor. Each segment of the conveyor will pick up some disks, but there is no uniformity in the quantity of disks on the segments. (It is even possible for a segment to pass through without picking up any disk.) For example, one segment might pick up one or two disks while another picks up the maximum or nearly the maximum it will carry. These disks are arranged in a horizontal row on each segment, but the number picked up ordinarily will provide an excess over that required to keep the assembly station supplied.

At the transfer station, the disks are swept off of the conveyor at intervals so that they come off in a plurality of horizontal rows, one above another, and pass into an aligner which arranges them into a single row. The disks which are in excess of that required to form such single row, are returned to the hopper. From this single row, the disks are supplied to a distributor that disposes them into a vertical tier or chute at the preliminary assembly station where they are held, to be released when the tubular shells are positioned to receive them. To increase the capacity of the apparatus, a number of such vertical tiers or chutes are provided, so the disks form both horizontal rows and vertical tiers.

The distributor supplies the disks to the various chutes or tiers in the assembly station, and provides means to distribute them without jamming. It comprises a conveyor which receives the disks from the aligner in spaced relation, positions them at the preliminary assembly station and releases them to fall generally in the vicinity of the tiers, where means guide them into the tiers without jamming. By this arrangement, the disks are more or less uniformly distributed to all the tiers, rather than bunching at the first tiers and starving the others.

At the proper time, the bottom row of disks are released to fall edgewise into an equal number of tubular shells positioned to receive them, the next adjacent row being held back. This next adjacent row then is released to the lowermost position ready for release, and so on. Because of the unsymmetrical form of the disk, it tends to topple over with the projecting portion downward and thus will assume the proper horizontal position for assembly to the tubular shell. This action may be assisted by the lowermost edge of the distributor mechanism, so that orientation of the disk is accomplished positively.

Numerous advantages and features of the present invention will become readily apparent from the following detailed description, taken in conjunction with the accompanying drawings, illustrating the preferred embodiment of the invention by way of example, and in which.

Figure 1:
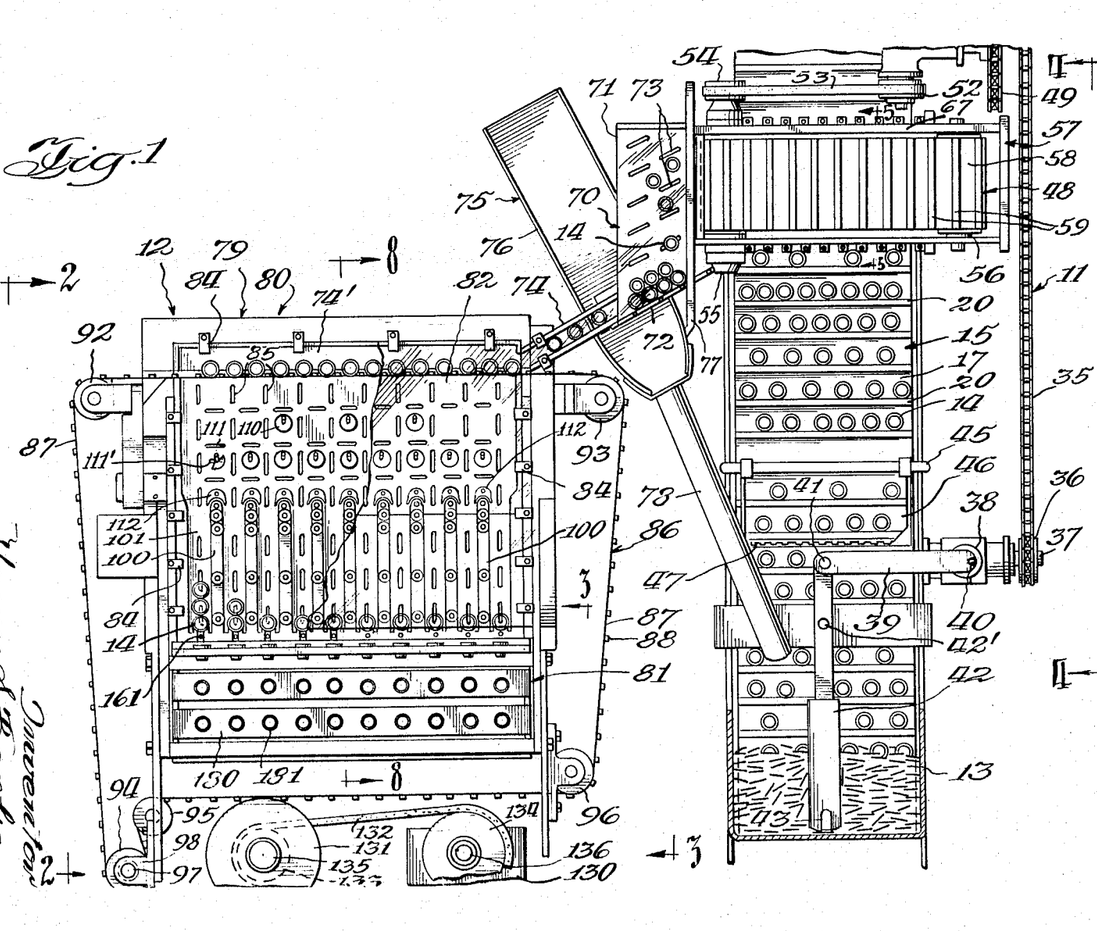
FIGURE 1 is a front elevational view of the machine, with parts broken away for clarity of illustration.
Figure 4:
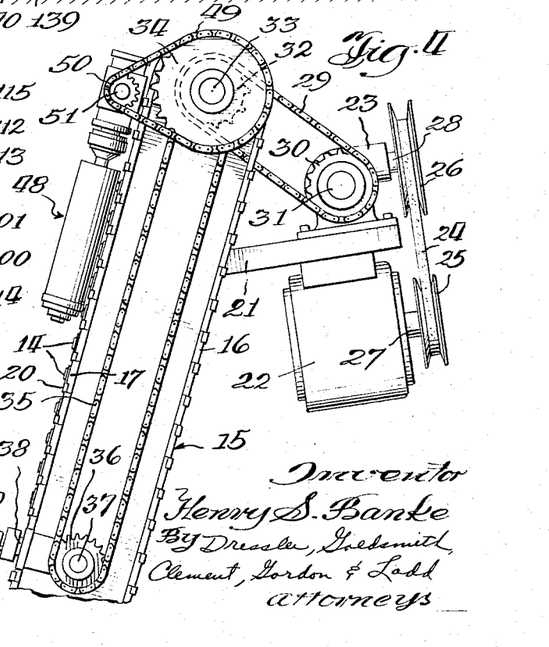
FIGURE 4 is a fragmentary end elevational view, looking from the plane 4—4 of FIGURE 1.
Figure 5:
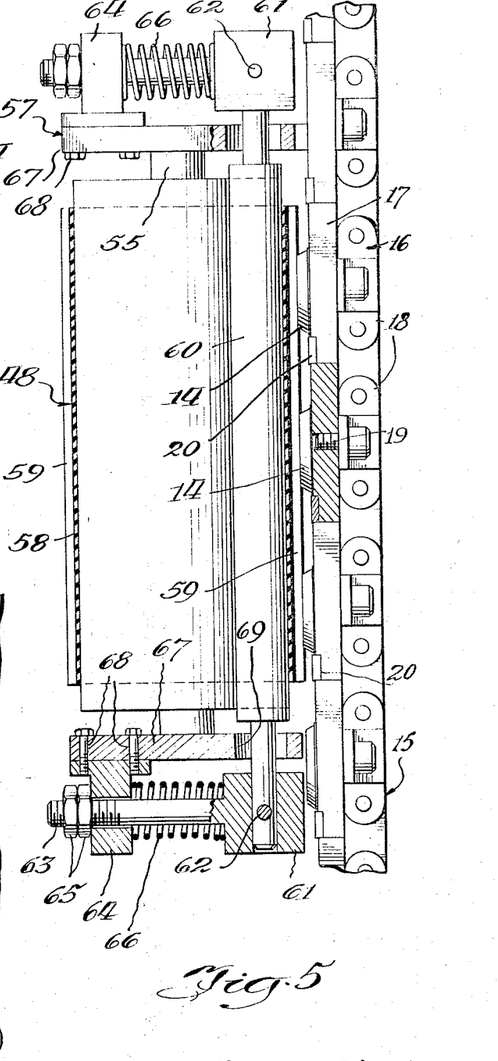
FIGURE 5 is a cross-sectional view, taken along the line 5—5 of FIGURE 1.

As shown in FIGURE 1, the machine comprises a disk aligning structure 11, and an assembling structure 12. The disk aligning structure includes an open top hopper 13 into which a supply of disks 14 is dumped in haphazard arrangement at intervals as needed. A vertically disposed endless conveyor 15 has its lower end extending into the hopper, and (FIGURES 1 and 4) comprises articulate belt segments 17 each with a projection or lug 20 at its bottom. The upper end of the conveyor 15 is inclined toward the rear, as shown in FIGURE 4, for a purpose hereinafter described. As shown in FIGURE 5, the conveyor 15 comprises a chain 16 having a belt segment 17 secured to each link 18 of the chain by a screw 19. The lugs 20 engage the edges of any of the disks 14 that happen to be properly positioned on the conveyor, and cause the conveyor 15 to move them upwardly to a transfer station.

Figure 2:
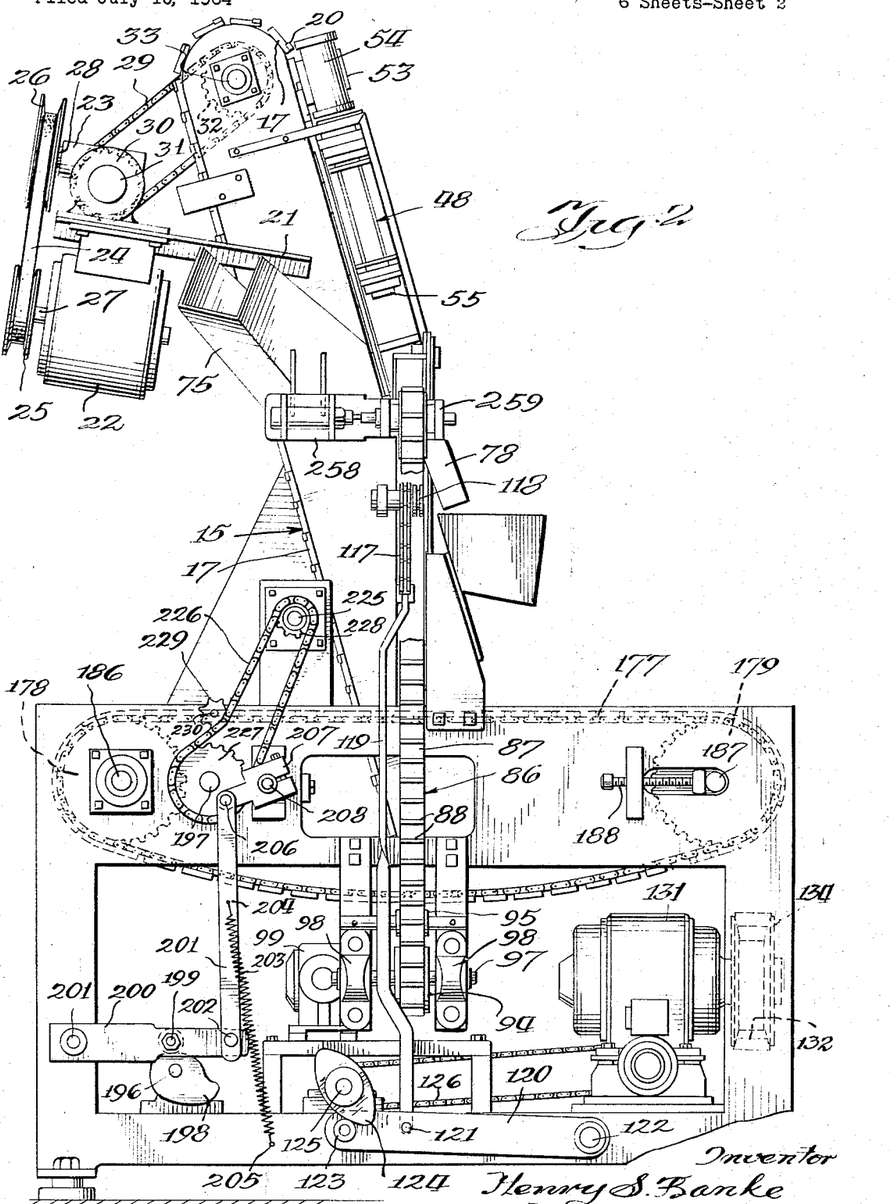
FIGURE 2 is an end elevational view, looking from the plane 2—2 of FIGURE 1, with parts broken away for clarity of illustration.

Referring to FIGURES 2 and 4, a bracket 21 mounted on the frame of the machine supports a motor 22 and a speed reducer 23. A belt 24 mounted on pulleys 25 and 26, fixed respectively on shafts 27 and 28 of the motor and speed reducer, drives the speed reducer. A chain 29 is trained over a sprocket 30 fixed to the output shaft 31 of the speed reducer, and over a sprocket 32 fixed to a shaft 33, to drive the shaft 33. The shaft 33 has fixed to it a pair of sprockets, only one sprocket 34 being shown, and the sprocket chain 16 is trained over the sprockets 34 and another similar pair of idler sprockets (not shown) in the hopper 13 near its bottom, whereby the conveyor is driven from shaft 33.

Another sprocket (not shown) on shaft 33 drives a chain 35 (FIGURES 1 and 4) which is trained over another sprocket 36 fixed to a shaft 37. Through suitable gearing (not shown), shaft 37 drives a shaft 38, (FIGURES 1 and 4) at right angles to it. A bar 39 has one end rotatably mounted on a crank pin 40 fixed eccentrically to shaft 38 and its other end fixed, as indicated at 41, to the upper end of an agitator arm 42 that is pivoted at 42' and extends into the hopper 13 almost to the bottom thereof. A paddle 43 fixed to the bottom of arm 42 and extending at right angles thereto is continuously oscillated to agitate the disks in the hopper so that they do not bridge or jam in the hopper.

Figures 12, 13:
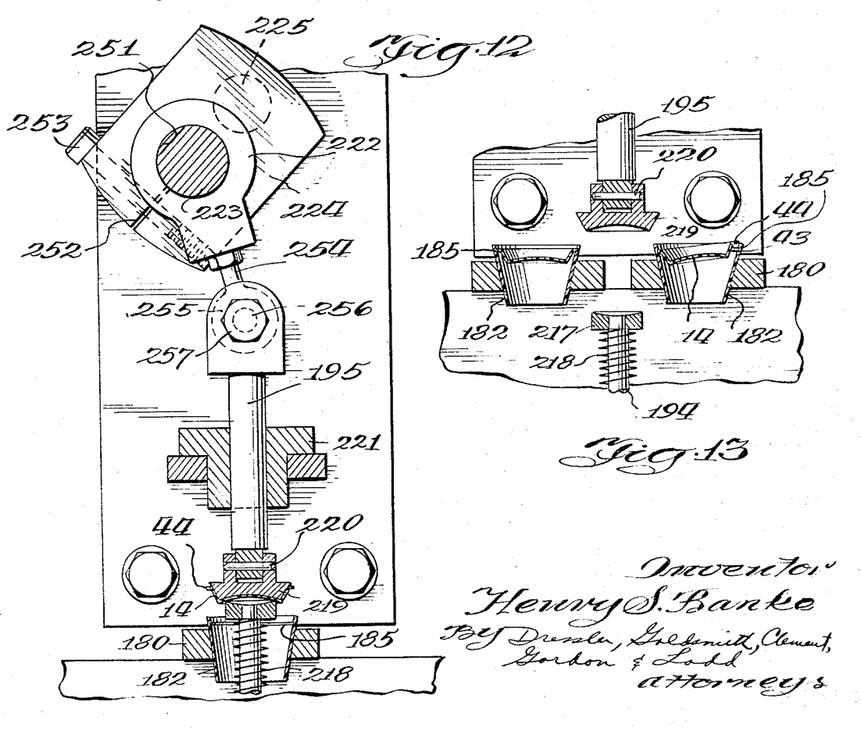
FIGURE 12 is an enlarged sectional view showing the plunger structure of FIGURE 7 in slightly different position.
FIGURE 13 is an enlarged fragmentary sectional view showing two tubular shells with the disks in position on opposite sides of the plunger of FIGURE 7.

As shown in FIGURE 13, the disk 14 is dished and has a tapered side wall 43 ending in a peripheral flange 44 that extends radially outwardly from the edge of the tapered side wall. As seen in FIGURES 4 and 5, lugs 20 extend forwardly of the belt segments 17 a distance less than the depth of the disk. Because the segments 17 of the conveyor are inclined, any disks in the hopper that are disposed on end adjacent the conveyor will lean against the conveyor, so a lug will engage the edge of such disks and tend to lift them. If the disk is disposed with its convex side toward the conveyor, it will lie on the segment 17 with the lug 20 engaging its edge, and the inclination of segment 17 is enough to prevent the disk from falling off the conveyor. On the other hand, if a disk 14 happens to be positioned vertically on a lug 20 with its concave surface facing the conveyor 15, the sloping side wall 43 of the disk will engage the forward edge of the lug 20, so that the disk will slide off the lug and fall back into the hopper 13. Thus, the conveyor lifts only those disks which engage it in such position that the convex wall is toward the conveyor surface.

Further provision is made of a brush-back to insure that only properly seated disks are lifted by the conveyor to the transfer station. This comprises a bar 45 (FIGURE 1) extending transversely of the conveyor 15 and spaced from its front surface, which carries pivoted frame 46 depending therefrom with its lower edge 47 biased, as by gravity, close to the lugs 20. Any insecurely seated disks will be brushed back into the hopper by edge 47, while properly seated disks will pass under the edge of the frame as the frame yields to permit this. Enough of the properly positioned disks stay on the conveyor to supply them in the desired quantity to the assembly station. The disks that remain on the conveyor 15 are carried upwardly in upright position to a transfer station which now will be described.

A transverse conveyor 48 (FIGURES 2, 4 and 5) is driven through a chain 49 trained over sprocket 34 and a smaller sprocket 50 (FIGURE 4). The sprocket 50 drives a shaft 51 that, through suitable gearing (not shown), drives a pulley 52 (FIGURE 1) over which a belt 53 is trained. The belt 53 is trained over another pulley 54 fixed to a shaft 55 that drives the transverse conveyor 48. The other end of the transverse conveyor extends around a shaft 56. Both shafts 55 and 56 are rotatably mounted in bearings in a frame 57 that forms part of the frame of the machine.

The transverse conveyor 48 comprises an endless belt 58 having vertically disposed lugs 59 projecting therefrom at intervals slightly greater than the diameter of the disks 14. Spring pressed posts 60 (FIGURE 5) positioned within the loop of belt 58 near each shaft 55 and 56 urge the rear reach of belt 58 rearwardly to hold the lugs 59 in proximity to the outer surface of lugs 20. As lugs 59 sweep across the conveyor 15, they engage the side walls of disks 14 that are seated thereon and sweep them laterally of the conveyor into an aligning device. The belt 58 is close enough to the outer surfaces of lugs 20 to prevent any of the disks from falling through the space between the rear surface of conveyor 48 and the front surface of conveyor 15.

Each post 60 has its ends mounted in blocks 61 to which they are pinned, as shown at 62, FIGURE 5. Each block 61 has a threaded stud 63 extending therefrom. A collar 64 loosely receives stud 63 and nuts 65 are threaded on the stud end. A compression spring 66 encircles each stud 63 between the collar 64 and the block 62. Each collar 64 is rigidly secured to a plate 67 by bolts 68, and the plates are fixed to frame member 77 by any suitable means. Each plate 67 is provided with an opening 69 through which extends one end of the post 60. The spring 66 urges post 60 rearwardly to the desired spaced relation to the conveyor 15, and the nuts 65 limit this space.

The transverse conveyor 48 is rotated continuously to move its rear reach from right to left, as seen in FIGURE 1. This movement causes the lugs 59 to sweep the disks toward the left, as viewed in FIGURE 1, off the conveyor 15 and into a transfer chute 70. The transfer chute 70 comprises two parallel plates 71 (only one being shown) spaced apart a distance slightly greater than the overall thickness of the disks 14 so that the disks can move therebetween but must retain their upright position during said movement. The front one of plates 71 is preferably transparent so that it can be observed if any of the disks 14 jam in the chute 70, and slots 73 are provided in front plate 71 to allow insertion of a rod to break any jam that occurs.

The bottom wall 72 of the transfer chute is inclined downwardly toward the left (FIGURE 1) and discharges into a passageway 74 formed between two tracks, and which supplies the disks to a header chamber 74'. When the supply of disks is ample, they form a continuous row resting on bottom 72 and extending into passageway 74. The header chamber 74' has a conveyor for moving the lowermost disk, thus allowing the disks to roll down bottom 72 and passageway 74. The transfer conveyor usually sweeps into chute 70 more disks than needed to keep an intact continuous bottom row, and the excess disks roll out from between the plates and drop into return chute 75. This chute comprises a trough 76 supported by a frame member 77 with an open edge adjacent the discharge end of chute 70. The open edge of trough 76 is wide enough to arrest all the disks that tumble out of chute 70. A tubular member 78 leads from the bottom of the trough into hopper 13 to return the excess of disks thereto.

The assembling structure comprises a frame 79 that provides the header chamber 74' and has an endless horizontal conveyor 81 for positioning the tubular shells under the disk distribution mechanism. As shown best in FIGURES 1 and 8, the disk distribution mechanism includes a pair of parallel panels 82 and 83 spaced apart a distance slightly greater than the overall thickness of a disk 14. Rear panel 83 carries a horizontal flange 89, and a housing 89' for the distribution chamber is carried thereby. The panel 82 is preferably transparent to allow observation of the movement of the disks through the distribution mechanism, and is held in place by clips 84 pivotally secured to the frame 79 so that the panel 82 may be easily removed. Rear panel 83 is rigidly held on the frame. Both panels are provided with vertical and horizontal slots 85 that permit the operator to insert a tool, such as a screw driver, to relieve minor jams of disks therebetween without removing the panel 82. The lower ends of panels 82 and 83 terminate just above the upper surface of the conveyor 81.

An endless conveyor 86 comprises a belt 87 and transversely extending lugs 88 projecting therefrom which are spaced apart a distance slightly larger than the diameter of a disk. The conveyor 86 extends around the frame 79 and the upper reach of the conveyor 86 is supported on the horizontal flange 89 extending across the disk distribution mechanism with its front edge flush with the front surface of panel 83. A slot 90 is formed between flange 89 and housing 89' extending horizontally across the frame and the upper reach of the conveyor 86 extends through this slot. The flange 89 is provided with an upstanding rib 91 parallel to the panel 83 and spaced rearwardly thereof a distance equal to the width of the conveyor 86 for a purpose hereinafter described. The conveyor 86 is trained around pulleys 92 and 93 that are spaced outwardly from the upper ends of the frame 79, and pulleys 94, 95 and 96 that are positioned adjacent the bottom of said frame. The shaft 97 of pulley 94 is mounted in bearings 98 and is driven by a motor 99 (FIGURE 9), through any suitable gearing, to move the upper reach of the conveyor 86 continuously from right to left as viewed in FIGURE 1. As the disks 14 move down passageway 74, in which they are vertically disposed, the lowermost one rests in upright position on the upper reach of conveyor 86 at the end of passageway 74, and is carried by the conveyor along the distribution chamber. As the conveyor moves this disk along in chamber 74', the disks in passageway 74 drop down to replace the removed disk, and the conveyor picks up the next disk from the end of the row in passageway 74. Thus, a row or series of disks spaced apart are conveyed into chamber 74', the panels 82, 83 keeping them in vertical position.

Figures 8, 9, 10:
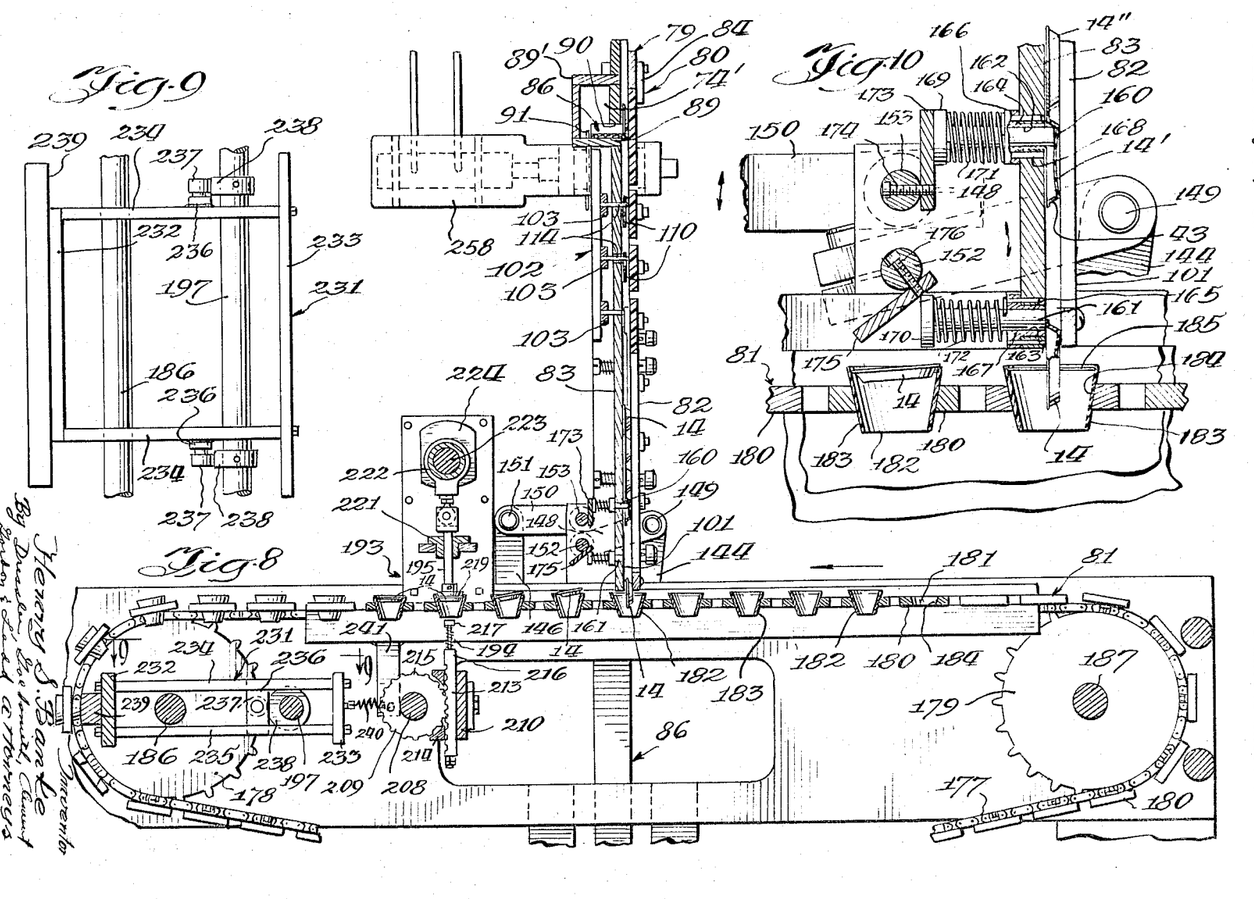
FIGURE 8 is a vertical sectional view, taken along the line 8—8 of FIGURE 1.
FIGURE 9 is a longitudinal sectional view, taken along the line 9—9 of FIGURE 8.
FIGURE 10 is a fragmentary sectional view showing the lower end of the disk distribution mechanism and the release means for allowing each disk to drop into the open top of a tubular shell.

The top reach of conveyor 86 and the pulleys 92, 93 are periodically moved to the left as seen in FIGURE 8, by an air cylinder 258. The conveyor is moved to the left until its right edge is flush with the front surface of panel 83, the rib 91 serving as a stop or limit. When this occurs, the disks carried by the conveyor are swept off and allowed to fall between plates 82, 83. The periodic actuation of air cylinder 258 is accomplished by a timer (not shown). The period during which the conveyor is retracted is relatively short. The period during which the conveyor is in nonretracted position is selected in accordance with the speed of the conveyor and the length of distribution chamber 74'. It is apparent that the retraction should occur before a disk picked up at the end of passageway 74 has completely traversed the chamber 74'.

Figure 11:
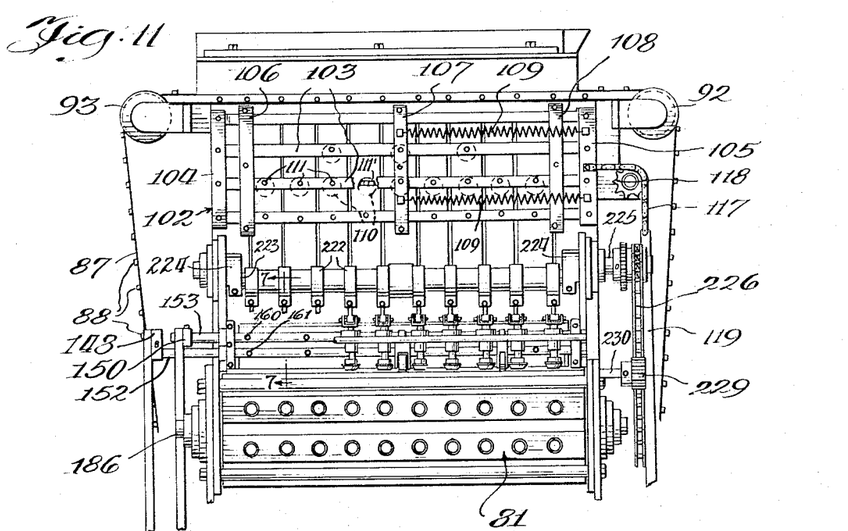
FIGURE 11 is a rear elevational view, showing the back of the disk distribution mechanism and the plungers for pressing the disk into the groove adjacent the upper end of the tubular shells.

A plurality of divider strips 100, positioned between the panels 82 and 83, extend vertically from the bottom of said panels to provide vertical discharge chutes 101 spaced transversely across the lower half of the space between panels 82 and 83. As shown in FIGURE 11, a rack 102 is juxtaposed against the back of panel 83 adjacent its upper portion. The rack 102 comprises a plurality of transverse bars 103 tied together by vertical bars 104 and 105 at opposite ends thereof. The rack 102 is held against the back of panel 83 by a plurality of fixed vertical bars 106, 107 and 108. A pair of tension springs 109 each have one end secured to the bar 105 and its other end to the bar 107.

Figure 6:
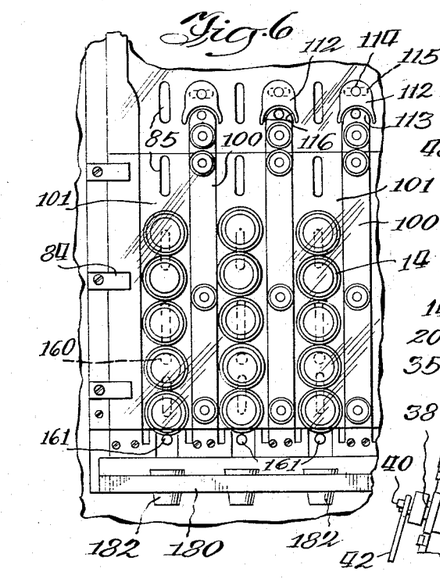
FIGURE 6 is an enlarged fragmentary front elevational view of the disk distribution mechanism.

Guide members in the form of flat circular disks 110 are positioned between the panels 82 and 83 in vertical alignment with the strips 100. Each disk 110 has a radical slot 110' that receives a pin 111, on which the disk is swivelled, and the slot allows vertical movement of the disk. The pins 111 are mounted on the rack bars 103 and extend through lateral slots 111, in rear plate 83. Other guide members in the form of a flat disk 112, each having a concave recess 113 in its lower edge to form two horns 116 that embrace the top of a divider strip 100, are provided. As shown in FIGURE 6, a pin 114 fixed in the lowermost bar 103 extends through a short horizontal slot 115 in panel 83, and into each disk 112, the disk being journalled on the pin. The guide disks 110 and 112 are oscillated, in a manner hereinafter described, to facilitate the distribution of the disks 14 into vertical chutes 101.

Referring to FIGURE 11, a short chain 117 extending around a sprocket 118 has one end secured to bar 105 and its other end secured to the upper end of a link 119. As shown in FIGURE 2, the link 119 has an intermediate twist and the lower end of the link is pivotally secured at 121 to a lever 120. The lever 120 is pivoted at one end to the frame of the machine, as indicated at 122, and a cam roller 123 is mounted on the other end of the lever 120. A rotary oval cam 124 mounted on a shaft 125 is continuously rotated, and reacts with roller 123 to periodically oscillate lever 120 and link 119, and chain 117 converts this into oscillation of rack 103. The connection between the lower end of link 119 and lever 120 is preferably close to the cam roller 123 to give the link 119 the maximum effect of the pivotal motion imparted to the lever 120 by the cam 124. Shaft 125 is rotated continuously in one direction by an endless chain 126 that is trained over a sprocket 127 (FIGURE 3) fixed to shaft 125, and over a sprocket 128 fixed to the output shaft 129 of a reduction gear box 130. The reduction gear train is driven by a motor 131 (FIGURE 2) through any suitable drive connections, such as, as shown in FIGURES 1 and 2, an endless belt 132 extending around pulleys 133 and 134 fixed respectively to shafts 135 and 136 of the motor and the reduction gear.

The contour of cam 124 is symmetrical about the axis of shaft 125 and the nose or projections thereof force cam roller 123 downwardly during each alternate approximate quarter revolution of the cam about said axis. The lever 120 is moved pivotally downwardly by the force exerted downwardly against the cam roller 123 by the cam surface. During the other two idler quarters of the revolution of the cam, the cam roller 123 and the adjacent end of lever 120 are free to move upwardly. The downward pivotal movement of lever 120 pulls chain 117 downwardly and thereby moves the rack 102 to the right, as viewed in FIGURE 11. The movement of the rack 102 to the right stretches the springs 109, and as soon as the cam completes that particular quarter of its revolution, the springs pull the rack towards the left as far as the peripheral surface of the cam permits. In this way, the cam roller 123 is always held in contact with the peripheral surface of the cam 124 and the rack is continuously reciprocated to oscillate the disks 110 and 112. The oscillation of disks 110 and 112 moves the disks 14 laterally between the panels 82 and 83 to prevent jamming as the disks move into the discharge chutes 101.

Referring to FIGURES 6 and 10, a pin 161 extends into the bottom of each chute 101 to bar the dropping of the lowermost disk, so the disks can accumulate in a vertical column in each chute. The pins 161 are periodically withdrawn to allow the disks to drop, and a restraining pin 160 catches the next adjacent disk, so as to allow only the lowermost disk to be fed. This feed mechanism now will be described in detail.

Figure 3:
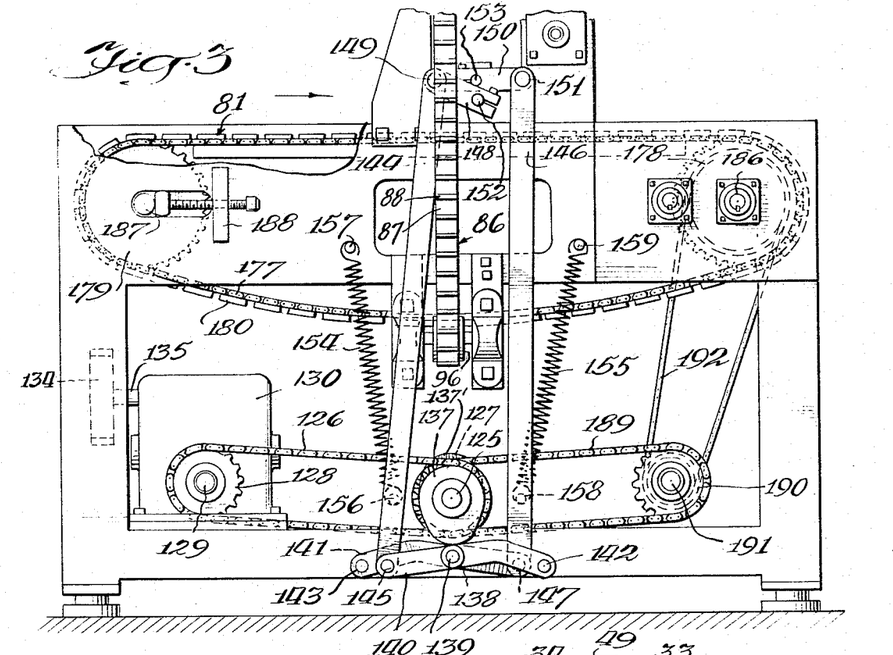
FIGURE 3 is a vertical sectional view, taken generally along the line 3—3 of FIGURE 1.

As shown in FIGURE 3, two oppositely disposed similar single nose cams 137 and 137' are fixed on shaft 125 and are rotated thereby. Cam 137 engages a cam roller 138 mounted on a pin 139 extending from a lever 140 pivoted at one end to the frame of the machine at 142, the opposite end of lever 140 being pivotally secured at 145 to one end of a link 144. A lever 148 is pivotally secured at one end at 149 to the upper end of link 144, and is clamped at its other end around a rod 152 that is rotatably mounted in suitable bearings. Cam 137' engages a roller (not shown) on lever 141, one end of this lever being pivoted at 143 to the frame and the opposite end being pivoted at 147 to the end of a link 146. A lever 150 is pivotally secured at 151 to the upper end of link 146, the other end of this lever being clamped around a rod 153.

Tension springs 154 and 155 have one end respectively anchored at 157, 159 to the frame, and the other end attached at 156, 158 to links 144, 146. The similar cams 137 and 137' are fixed to the shaft 125 with their noses in diametrically opposite positions. Accordingly, as the cam 137 moves the link 144 downwardly against the action of tension spring 154, the cam 137' allows the tension spring 155 to move the link 146 upwardly. Upward movement of the link 144 rotates the rod 152 clockwise, and upward movement of the link 146 rotates the rod 153 counterclockwise, as viewed in FIGURE 3. The vertical movement of levers 144 and 146, and the rotational movement of rods 152 and 153 are limited by the difference between the minimum and maximum radii of the contours of the cams 137 and 137'.

As shown in FIGURES 6 and 10, the pins 160 and 161 of the feed structure are disposed rearwardly of panel 83, and respectively are in axial alignment with vertically spaced apertures 162 and 163 that extend through panel 83. One pair of said apertures and pins are located in each vertical discharge chute 101. The apertures 162 and 163 are preferably provided with tubular sleeves 164 and 165, respectively. The sleeve 164 is provided at one end with a lateral flange 166 that butts against the rear surface of the panel 83. The sleeve 165 is provided with a similar lateral flange 167 that also butts against the rear surface of the panel 83. The sleeves 165 and 166 may be secured to the panel 83 in any suitable manner, as, for example, by means of pins 168 that project through the flange and the panel. The pin 160 has an enlarged head 169 concentric with and parallel to the flange 166 of sleeve 164. The pin 161 has an enlarged head 170 concentric with and parallel to the flange 167 of sleeve 165.

A compression spring 171 encircles pin 160 and is biased between the flange 166 and the enlarged head 169 to retract pin 160 into aperture 162. A compression spring 172 encircles pin 161 and is biased between the flange 167 and the enlarged head 170 to retract pin 161 into aperture 163. In its retracted position, each of the pins 160 and 161 has its free end approximately flush with, or slightly rearwardly of, the front surface of the panel 83. A pusher arm 173 secured on shaft 153, as by screw 174, and pusher arm 175 secured on shaft 152 by screw 176 hold the pins 160, 161 in extended position against the bias of springs 171, 172.

The operation of pins 160 and 161 will be described with reference to FIGURES 8 and 10 where the various elements are in the positions occupied when the link 144 is in its lowermost position and the link 146 is in its uppermost position. In this position, the pin 160 projects forwardly of the front surface of panel 83, and pin 161 is retracted into aperture 163 and lies flush or within panel 83. The link 144 is moved upwardly and the link 146 is moved downwardly simultaneously. The upward movement of link 144 rotates rod 152 in counterclockwise direction, thereby causing pusher 175 to move pin 161 against the action of spring 172 to project forwardly of the front surface of panel 83 into a chute 101. The downward movement of link 146 rotates rod 153 in counterclockwise direction, thereby causing pusher 173 to move away from head 169, so spring 171 will move pin 160 into its retracted position flush with the surface of plate 83.

In the position of FIGURE 10, the pin 160 is projecting into discharge chute 101 and engages the side wall 43 of the disk on the inside of the wall to keep it from falling through the discharge chute. The pin 161 is retracted to allow the lowermost disk 14 to fall through the discharge chute. The disk 14 retains its vertical position, with its top surface facing to the left, as it drops through the open bottom of discharge chute 101. Now, when pin 162 is retracted (pin 161 meanwhile being projected into the chute), disk 14' drops downwardly in chute 101, and the projecting pin 161 engages the lower peripheral edge of the disk 14' to hold it in chute 101 above pin 161. In the meantime, the next disk 14'' moves downwardly in chute 101 in contact with disk 14, and in the lowermost position disk 14'' is in registration with pin 160 occupying the position of disk 14' (FIGURE 10), and the feeding operation can be repeated to feed out disk 14'. The rate at which disks 14 are discharged from chute 101 is accurately controlled by the timing of cam 137.

As shown best in FIGURE 8, the conveyor 81 comprises an endless chain 177 trained over sprockets 178 and 179. Only one chain is shown, but it will be understood that one chain is provided adjacent each side of the conveyor. A tightening adjustment device 188 (FIGURE 3) is provided for shaft 187. Plates 180 extending transversely of the conveyor 81 are secured adjacent each end to one of the chains 177. Each plate 180 is provided with a series of sockets in the form of apertures 181 adapted to receive the tubular shells 182. The tubular shells may be manually positioned in the apertures 181 and lie in vertical position with the smaller end at the bottom.

The tubular shells have conical side walls 183, and the apertures 181 are conical with the same apex angle. Accordingly, each tubular shell is maintained firmly in its socket in which it is seated, and the tubular shells project a uniform distance above plate 180. The tubular shell is provided with an annular groove 185 (FIGURE 13) on its inner surface adjacent its upper edge. During the assembly operation, hereinafter described, the flange 44 of the disk 14 is forced into the annular groove to hold the disk and tubular shell together as a unit.

FIGURE 3 shows the drive for shaft 186. A chain 189, trained over a sprocket (not shown) fixed to shaft 125 and over a sprocket 190 fixed to shaft 191, drives shaft 191. A belt 192 is trained over pulleys (not shown) mounted on shafts 191 and 186 to drive shaft 186. The conveyor 81 is driven at a speed synchronized with cam 137 so that a plate 180 having a row of tubular shells 182 is presented under the open bottom of the discharge chutes 101 every time the pins 161 are retracted to allow a disk 14 to fall out of each discharge chute. Each disk 14 falls into a tubular shell 182 in a vertical position with its flange edge resting on a tubular shell, and tends to topple in the direction of its projection portion as seen in FIGURES 8 and 10, but is restrained by engagement with the edge of plate 82. As the conveyor 81 carries the tubular shells to the left out of vertical alignment with the discharge chutes 101, the disks in the shells topple over clockwise so that each disk 14 is approximately seated in the upper edge portion of a tubular shell with the convex surface of each disk 14 facing upwardly, as shown at the left of FIGURE 10.

Each tubular shell 182, with a disk 14 loosely positioned in its upper portion, is moved to a final assembly station 193 where are located two oppositely disposed plungers 194 and 195, and means for reciprocating said plungers in vertical alignment. Referring to FIGURE 2, two separate shafts 196 and 197 are driven by shaft 186 through suitable sprockets and chains that are omitted from the drawing for clarity. A cam 198 is fixed to shaft 196 in position to engage a stud 199 projecting from the intermediate portion of a lever 200 pivoted to the frame of the machine at 201. The other end of lever 200 is pivotally secured at 202 to the lower end of a link 201. A spring 203, having one end secured at 204 to the intermediate portion of the link 201, and its other end secured at 205 to the frame of the machine, urges lever 200 downwardly and thereby holds stud 199 in engagement with the peripheral surface of cam 198. The upper end of link 201 is pivotally connected at 206 to a rocker arm 207 that is clamped to a shaft 208. As the lever 200 is moved pivotally by the action of cam 198 and spring 203, the link 201 is reciprocated vertically to rock arm 207 and thereby oscillate shaft 208.

Figure 7:
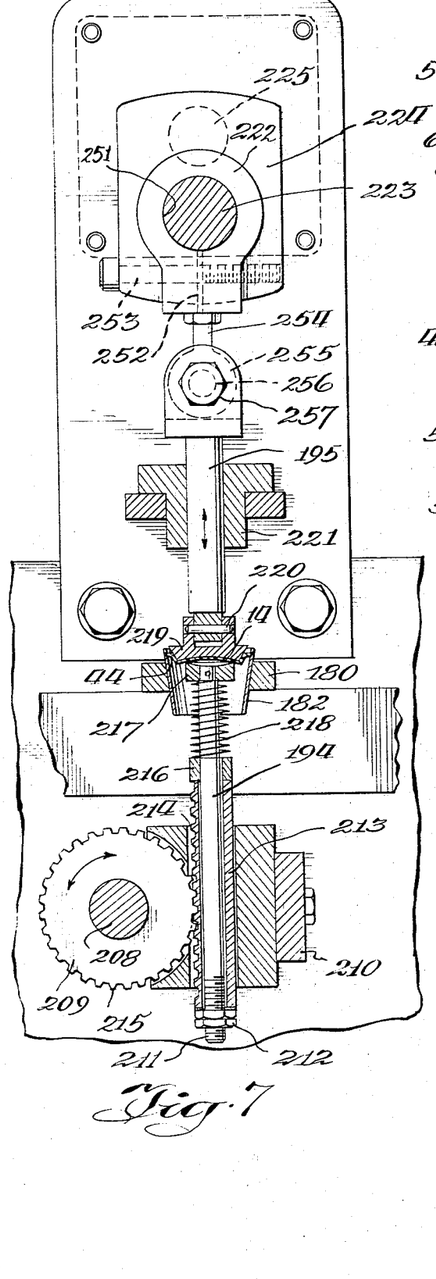
FIGURE 7 is an enlarged vertical sectional view, taken along the line 7—7 of FIGURE 11.

As shown in FIGURES 7 and 8, a gear 209 mounted on shaft 208 extends through a slot in a bearing 210 that supports the lower plunger 194. The lower end of the lower plunger is threaded, as indicated at 211, to receive two nuts 212 that are threaded thereon to support a sleeve 213 fitting around the lower plunger. One surface of sleeve 213 is provided with a rack 214 engageable with the teeth 215 of gear 209. A collar 216 is seated on top of sleeve 213, and a collar 217 is secured to the top of plunger 194. A compression spring 218 encircles plunger 194 between the collars 216 and 217.

As the plunger 194 is moved upwardly by the sleeve 213 through the agency of the collar 216 and spring 218, the collar 217 engages the underside of disk 14 and lifts it against the bottom surface of a die 219 secured, by means of a pin 220, to the lower end of the upper plunger 195. The sleeve 213 moves upwardly more than enough to engage disk 14 against die 219, thus compressing the spring 218. This eliminates the need for accurate movement of the collar 217 in bringing the disk against the die. Die 219 then moves downward to drive disk 14 downwardly to cause its flange 44 to snap into the annular groove 185.

The upper plunger 195 is held in vertical alignment with the lower plunger 194 by a bearing 221 and it is reciprocated vertically by an eccentric 222. The eccentric is mounted on a shaft 223 having its ends mounted in blocks 224 that are rotated by stub shafts 225. Each block 224 has an opening 251 to receive one end of the shaft 223 and a slit 252 extending from the opening 251 to one end of the block to facilitate securement of the shaft 223 to the block 224. After the shaft 223 has been inserted into the opening 251, a bolt 253 is screwed across the split end of the block 224 to tighten the block against the shaft to prevent relative movement between the shaft and the block. The eccentric 222 has a stem 254 terminating in a ring 255 pivotally secured to the top of plunger 195 by a bolt 256 and nut 257.

As shown in FIGURE 2, each stub shaft 225 is rotated by a chain 226 driven by a sprocket 227 mounted on a shaft 197 and trained over another sprocket 228 mounted on shaft 225. A sprocket 229, fixed to an idler shaft 230 mounted on the frame of the machine, engages the chain 226 to keep it taut. The movements of the plungers 194 and 195 are synchronized so that while the upper plunger is stationary, the lower plunger 194 raises the disk 14 slightly above the shell 182 and centers it on the die 219. The lower surface of the die 219 is shaped to fit accurately against the upper surface of the disk 14. Then, the die moves the disk 14 downwardly overcoming the force of spring 218, and forces the disk downwardly into the tubular shell 182 until the flange 44 of the disk is snapped into the groove 185 of the tubular shell. The plunger 194 is then moved downwardly and the plunger 195 is simultaneously moved upwardly, and the overcap, now completely assembled, is carried by the conveyor toward the discharge area.

The discharge apparatus, as shown in FIGURES 8 and 9, comprises a frame 231 consisting of two transverse plates 232 and 233 tied together by vertically spaced longitudinal rails 234 and 235 at each end of said plates. The rails 234 and 235 straddle shafts 186 and 197. A block 236 secured to each pair of rails 234 and 235 adjacent shaft 197 has a cam roller 237. A cam 238 is mounted on shaft 197 in alignment with each cam roller 237. As shaft 197 rotates, cams 238 move the frame 231 to the left (FIGURE 8) to cause a bar 239 secured to plate 232 to push the entire row of overcaps aligned therewith out of the apertures 181 of the conveyor 81. A spring 240 secured at one end to plate 233 and at its other end to a lug 241 extending from the frame of the machine retracts the frame 231 when the cam 238 permits retraction.

The operation of the entire machine now will be described. Referring to FIGURE 1, the conveyor 15 picks up disks 14, which are by chance positioned with the convex face toward the conveyor, these disks being maintained on the conveyor because the projection 20 engages the rim, and the inclination of the conveyor biases the disk against the conveyor. The paddle 42 keeps the caps in hopper 13 agitated. The disks are raised to the transfer station where the bars 59 on conveyor 57 sweeps them into a chute 70 where they align themselves into a row on bottom plate 72 and roll down track or passageway 74. Any excess of disks in chute 70 fall into trough 75 and return to hopper 13. At the bottom of passageway 74, a distributor conveyor 86 moves the disks in spaced relation into distribution chamber 74', but before the forward disk can be carried completely through the distribution chamber, the conveyor belt 86 retracts to drop the disks between panels 82 and 83. They are joggled and guided into the vertical chutes 101.

It should be noted that the apparatus provides an overfeed of disks to the distribution chamber, and provides a storage of excess disks above the chutes 101, thus insuring a supply of disks of all the troughs. The agitator disks 110 and horned disks 112 help to guide the disks 14 into the chutes 101. The lowermost disk in each chute 101 is barred from falling through by pin 161. This pin is retracted when the conveyor 81 brings a group of tubular shells 182 in position under chutes 101 to receive a disk. When a pin 161 is retracted, pin 160 (FIGURES 6 and 10) is projected to arrest the next adjacent disk, thus providing a feed of one disk at each operation. The lowermost disk falls into a tubular shell 182 and turns clockwise into the top of a tubular shell as soon as the conveyor 81 moves it clear of the plate 82. The clockwise turning of the disk may be assisted by engagement of the disk with the lowermost edge of the panel 83 as the disk is moved to the left, as seen in FIGURE 8. In the meantime, pin 160 is retracted to allow the next disk to drop and be barred by pin 161 which has moved into extended position.

The conveyor 81 carries a tubular shell and disk to the final assembly station where (FIGURE 7) plunger 194 raises and centers the disk against die 219, whereupon plunger 195 moved down to force the disk into its seat ring in the tubular shell 182. The assembled units are then pushed out of the conveyor by the pusher bar 239 (FIGURE 8).

Although I have described a preferred embodiment of the invention in considerable detail, it will be understood that the description is intended to be illustrative, rather than restrictive, as many details of the structure may be modified or changed without departing from the spirit or scope of the invention. Accordingly, I do not desire to be restricted to the exact structure described.

I claim:

1. In combination, a disk distributing mechanism having a plurality of discharge chutes spaced laterally across its lower portion, means for selectively removing individual disks from a source of disks wherein the disks are in haphazard arrangement, means for moving said individual disks into alignment with the upper portion of said disk distribution mechanism, means for supporting said individual disks in said disk distribution mechanism above said discharge chutes and insuring substantially uniform distribution of said disks along the entire length of said disk distribution mechanism, means to intermittently cause said disks to be displaced from said supporting means and to cause said individual disks to drop downwardly into said discharge chutes, conveyor means for moving a plurality of tubular shells below the lower ends of said discharge chutes to locate a tubular shell in alignment with the lower end of each of said discharge chutes, means in each of said discharge chutes to release a disk from said chute when a tubular shell is positioned in alignment therewith, whereby each disk released from said discharge chutes enters a tubular shell, and means positioned adjacent said conveyor means rearwardly of said distribution means for securing each disk to the shell in which it is seated.

2. In combination, a disk distributing mechanism having a plurality of discharge chutes spaced laterally across its lower portion, means for selectively removing individual disks from a source of disks wherein the disks are in haphazard arrangement, means for moving said individual disks into alignment with the upper portion of said disk distribution mechanism, means for supporting said individual disks in said disk distribution mechanism above said discharge chutes and insuring substantially uniform distribution of said disks along the entire length of said disk distribution mechanism, means to intermittently cause said disks to be displaced from said supporting means and to cause said individual disks to drop downwardly into said discharge chutes, a pair of axially aligned oppositely disposed plungers spaced rearwardly of said discharge chutes, means for moving a plurality of tubular shells past said discharge chutes and past said plungers in a plane below the lower ends of said discharge chutes and between the ends of said pairs of oppositely disposed plungers, means in each of said discharge chutes to release a disk from said chute when a tubular shell is in alignment therewith, whereby each disk released from said chutes enters a tubular shell, each of said pairs of plungers being operable to secure each of said disks to the tubular shell in which it is seated as said shell and disk are moved into alignment with one of said pairs of oppositely disposed plungers.

3. In a machine for assembling overcaps, disk aligning means comprising a conveyor for moving disks upwardly in predetermined position from a supply of disks in haphazard arrangement, an open top disk distribution mechanism spaced laterally from said conveyor, said disk distributing mechanism including a plurality of laterally spaced discharge chutes, conveyor means for moving said disks from said vertical conveyor in alignment with the open top of said disk distribution mechanism, means for shifting said conveyor means relative to said disks to allow said disks to drop into said distribution mechanism in said predetermined position, means to guide said disks into said discharge chutes, and means in each of said discharge chutes to release the lowermost disk from each discharge chute and to hold the upper disks against release as said released disks move out of said discharge chutes.

4. In a machine for assembling overcaps, disk aligning means comprising a conveyor for moving disks upwardly in predetermined position from a supply of disks in haphazard arrangement, an open top disk distribution mechanism spaced laterally from said conveyor, said disk distributing mechanism including a plurality of laterally spaced discharge chutes, and means for moving said disks from said conveyor while maintaining said predetermined position of the disks, said last mentioned means including a transverse conveyor extending along the open top of said disk distribution mechanism and engageable with said disks to move them in alignment with the open top of said distribution mechanism, means for shifting said transverse conveyor relative to said disks to allow said disks to drop into said distribution mechanism in said predetermined position, means to guide said disks into said discharge chutes, a pair of vertically spaced pins in each of said discharge chutes, said pins extending transversely of said discharge chutes, and means to reciprocate said pins simultaneously in opposite directions to release the lowermost disk from each discharge chute and to hold the upper disks in said discharge chutes as the released disks move out of said discharge chutes.

5. In a machine for assembling overcaps, disk aligning means comprising a conveyor having a lower end extending into a supply of disks in haphazard arrangement, said conveyor including an endless belt, means to drive said belt, and transversely extending lugs engageable with said disks to move them upwardly from said supply, an open top disk distribution mechanism spaced laterally from said conveyor, said disk distributing mechanism including a plurality of laterally spaced discharge chutes, means for moving said disks from said conveyor while maintaining said disks in predetermined position, said last mentioned means including a first transverse conveyor engageable with disks carried upwardly by said conveyor to move them laterally toward said disk distribution mechanism and a second transverse conveyor extending along the open top of said disk distribution mechanism and engageable with disks moved by said first transverse conveyor to move them in alignment with said disk distribution mechanism, means for shifting said second transverse conveyor relative to said disks to cause said disks to drop into the open top of said disk distribution mechanism in said predetermined position, a pair of vertically spaced pins in each discharge chute, cam means for simultaneously moving said pins horizontally in opposite directions, each of said pins being movable into projecting position into said chute to hold a disk against gravity, and into retracted position to release the engaged disk whereby it may drop out of its discharge chute.

6. A machine for assembling overcaps, said machine comprising means for removing disks from a supply of disks in haphazard arrangement and aligning said disks in predetermined position, a horizontal conveyor adapted to successively move a plurality of rows of tubular shells into assembly position with the shells of each row in predetermined laterally spaced relationship, means for moving said disks into row formation in horizontal planes above the horizontal plane of said conveyor and with the disks of each row in the same laterally spaced relationships as said shells, means for simultaneously engaging the disks of one row and releasing the disks of a lower row to drop each disk of the lower row into one of said tubular shells located under said lower row of disks, and means for securing each disk to the tubular shell into which it is dropped.

7. A machine for assembling overcaps, said machine comprising means for removing disks from a supply of disks in haphazard arrangement and aligning said disks in predetermined position, an open top distribution mechanism including a plurality of discharge chutes in laterally spaced relationship, a transverse conveyor for moving said disks in alignment with the open top of said distribution mechanism in said predetermined position, means for shifting said traverse conveyor transversely of its length to drop said disks into the top of said distribution mechanism, a plurality of guide members pivotally mounted in said distribution mechanism, means to oscillate said guide members in engagement with disks in said distribution mechanism to facilitate movement of said disks into said discharge chutes, release means allowing the lowermost disk in each discharge chute to drop into a tubular shell aligned therewith, and means for securing each disk to the tubular shell into which it is dropped.

8. A machine for assembling overcaps, said machine comprising means for removing disks from a supply of disks in haphazard arrangement and aligning said disks in predetermined position, a plurality of vertical discharge chutes in laterally spaced relationship, means for aligning said disks in said discharge chutes, said last mentioned means comprising a transverse conveyor for moving said disks above said discharge chutes in said predetermined position, means for shifting said transverse conveyor transversely of its length to allow said disks to drop downwardly and move into said discharge chutes by gravity, a horizontal conveyor adapted to successively move a plurality of rows of tubular shells under said discharge chutes in alignment therewith, release means for allowing the lowermost disk in each discharge chute to drop into a tubular shell aligned therewith, and means for securing each disk to the tubular shell into which it is dropped.

9. A machine for assembling overcaps, said machine comprising means for removing disks from a supply of disks in haphazard arrangement and aligning said disks in predetermined position, a plurality of vertical discharge chutes in laterally spaced relationship, means for aligning said disks in said discharge chutes, said last mentioned means comprising a transverse conveyor for moving said disks above said discharge chutes in said predetermined position, means for shifting said transverse conveyor transversely of its length to allow said disks to drop downwardly and move into said discharge chutes by gravity, a horizontal conveyor adapted to successively move a plurality of rows of tubular shells under said discharge chutes in alignment therewith, release means for allowing the lowermost disk in each discharge chute to drop into a tubular shell aligned therewith, a pair of oppositely disposed vertically aligned plungers, and means for moving a tubular shell, with a disk seated therein, between said plungers, one of said plungers being operable to center said disk above said tubular shell, said other plunger being operable to force said disk downwardly into engagement with said tubular shell to secure said disk to said tubular shell.

10. A machine for assembling overcaps, said machine comprising a disk distribution mechanism having an open top, means for removing a plurality of disks from a supply of disks in haphazard arrangement and aligning them in predetermined position, means for moving said disks into the open top of said disk distribution mechanism in said predetermined position, said disk distribution mechanism comprising a pair of vertical panels in parallel relationship spaced apart a distance slightly greater than the thickness of each disk, whereby said predetermined position of each disk is maintained as it moves downwardly through the disk distribution mechanism by gravity, a plurality of strips fixed between the lower portions of said panels in laterally spaced relationship to divide the space between said panels into a plurality of discharge chutes, a plurality of guide members pivotally mounted between said panels above said strips, and means periodically oscillating said guide members to facilitate movement of said disks into said discharge chutes.

11. A machine for assembling overcaps, said machine comprising a disk distribution mechanism having an open top, means for removing a plurality of disks from a supply of disks in haphazard arrangement, arranging them in predetermined position and moving them into the open top of said disk distribution mechanism in said predetermined position, said disk distribution mechanism comprising a pair of vertical panels in parallel relationship spaced apart a distance slightly greater than the thickness of each disk, whereby said predetermined position of each disk is maintained as it moves downwardly through the disk distribution mechanism by gravity, a plurality of strips fixed between the lower portions of said panels in laterally spaced relationship to divide the space between said panels into a plurality of discharge chutes, a plurality of guide members pivotally mounted between said panels above said strips, means periodically oscillating said guide members to facilitate movement of said disks into said discharge chutes, means for seating each of said disks in a tubular shell, and means operable to press each disk into interengagement with the shell in which it is seated.

12. A machine for assembling overcaps, said machine comprising a disk distribution mechanism having an open top, means for moving a plurality of disks into the open top of said disk distribution mechanism in predetermined position, said disk distribution mechanism comprising a pair of vertical panels in parallel relationship spaced apart a distance slightly greater than the thickness of each disk, whereby said predetermined position of each disk is maintained as it moves downwardly through the disk distribution mechanism by gravity, a plurality of laterally spaced discharge chutes in said disk distribution mechanism, a plurality of guide members mounted between said panels to facilitate movement of said disks into said discharge chutes, pins holding said disks against removal from said discharge chutes, means for holding a plurality of open ended tubular shells in laterally spaced arrangement conforming to the lateral spacing of said discharge chutes and for moving said tubular shells in a horizontal plane below said disks, cam operated means for releasing said pins to drop each of the disks of the lowermost row into one of said tubular shells in alignment with said discharge chutes, and means for pressing each disk into interengagement with the tubular shell into which it is dropped.

13. An apparatus comprising means for arranging a plurality of disks in an upright plane in a row in predetermined laterally spaced arrangement and in vertical tiers, means for positioning a plurality of open-ended tubular shells below and in vertical alignment with said disks in the row and spaced laterally to substantially align with said disks, holding means to prevent the lowermost disks from moving, means for releasing said holding means to allow the disks in said row to drop into the respective tubular shells and turn to substantially horizontal position in the shell, and means for pressing each disk into interengagement with the tubular shell into which it is dropped.

14. In a machine for assembling overcaps, the combination comprising: (1) disk orienting means comprising a conveyor extending into a source of disks in haphazard arrangement, said conveyor having a surface with transversely extending lugs thereon proportioned to engage the edges of individual disks and support them with their upper surfaces facing the conveyor surface to selectively remove them from said source; (2) a disk distributing mechanism having a plurality of laterally arranged substantially vertical discharge chutes; means for transferring oriented disks in horizontal alignment from the disk orienting means to the upper portion of said disk distribution mechanism, including means for supporting said aligned disks above said discharge chutes; means intermittently relatively displacing said disks and supporting means to cause said disks to drop downwardly into said discharge chutes; a pair of horizontal vertically spaced projections disposed in a discharge chute, each projection being movable between a disk restraining position and disk releasing position; (3) an assembly station including means for moving a plurality of tubular shells adjacent the lower ends of said discharge chutes; means for substantially simultaneously moving said projections to opposed positions to release the lowermost disk for entering a tubular shell; and a pair of axially aligned oppositely disposed plungers operable to receive a disk therebetween and insert the disk into a tubular shell.

15. In a machine for assembling overcaps, the combination comprising a disk distributing mechanism having a plurality of laterally arranged substantially vertical discharge chutes; means for moving and supporting disks in horizontal alignment along the upper portion of said disk distributing mechanism; means intermittently relatively displacing said disks and supporting means to cause said disks to drop downwardly into said discharge chutes; a pair of horizontal vertically spaced projections disposed in a discharge chute, each projection being movable between a disk restraining position and disk releasing position; an assembly station including means for moving a plurality of tubular shells adjacent the lower ends of said discharge chutes; means for substantially simultaneously moving said projections to opposed positions to release the lowermost disk for entering a tubular shell; and a pair of axially aligned oppositely disposed plungers operable to receive a disk therebetween and insert the disk into a tubular shell.

16. A machine for assembling overcaps, said machine comprising: means for moving disks from a supply of disks in haphazard arrangement and aligning said disks in predetermined position; means to successively move a plurality of rows of tubular shells into assembly position with the shells of each row in predetermined laterally spaced relationship; means for moving said disks into row formation in horizontal planes above tthe rows of tubular shells, and with the disks of each row in the same laterally spaced relationship as said shells; means for simultaneously engaging the disks of one row and releasing the disks of a lower row to drop each disk of the lower row into one of said tubular shells located under said row of disks; and means for securing each disk to the tubular shell into which it is dropped.

17. In a machine for assembling overcaps, means for moving a plurality of disks from a supply of disks in haphazard arrangement and aligning them; an open top disk distributing mechanism including a plurality of spaced discharge chutes; means for moving and supporting said disks across the open top of said disk distributing mechanism; means intermittently relatively displacing said disks and supporting means to cause said disks to drop downwardly into said discharge chutes; and means in each of said discharge chutes to release the lowermost disk from each discharge chute and to hold the upper disks against release as said released disks move out of said discharge chutes.

References Cited by the Examiner
UNITED STATES PATENTS

| | | | |
|---|---|---|---|
| 453,130 | 5/1891 | Ritscher | 198—45 |
| 1,302,280 | 4/1919 | Batchelder | 29—211 |
| 1,315,166 | 9/1919 | Semashko | 29—211 |
| 1,822,336 | 8/1931 | Burns | 198—20 |
| 1,982,902 | 12/1934 | Clark | 221—119 |
| 2,142,109 | 1/1939 | Burke | 29—430 |
| 2,734,620 | 2/1956 | Fischer et al. | 198—45 |
| 2,809,768 | 10/1957 | Pollman et al. | 221—68 |
| 2,915,217 | 12/1957 | Chaplinski | 221—68 |
| 3,024,523 | 3/1962 | Donaldson | 29—208 |
| 3,043,001 | 7/1962 | Gluck | 29—203 |
| 3,054,170 | 9/1962 | Benichasa et al. | 29—208 |
| 3,066,395 | 12/1962 | Hopkins | 29—203 |
| 3,102,332 | 9/1963 | Porcelli | 29—208 |
| 3,112,562 | 12/1963 | Wilson | 29—430 |
| 3,118,218 | 1/1964 | Gleason et al. | 29—211 |

JOHN F. CAMPBELL, *Primary Examiner.*

THOMAS H. EAGER, *Examiner.*